June 28, 1960   R. HUBER ET AL   2,942,304
BEATING DEVICE FOR OPENING FIBRE BALES
Filed March 4, 1957   2 Sheets-Sheet 2

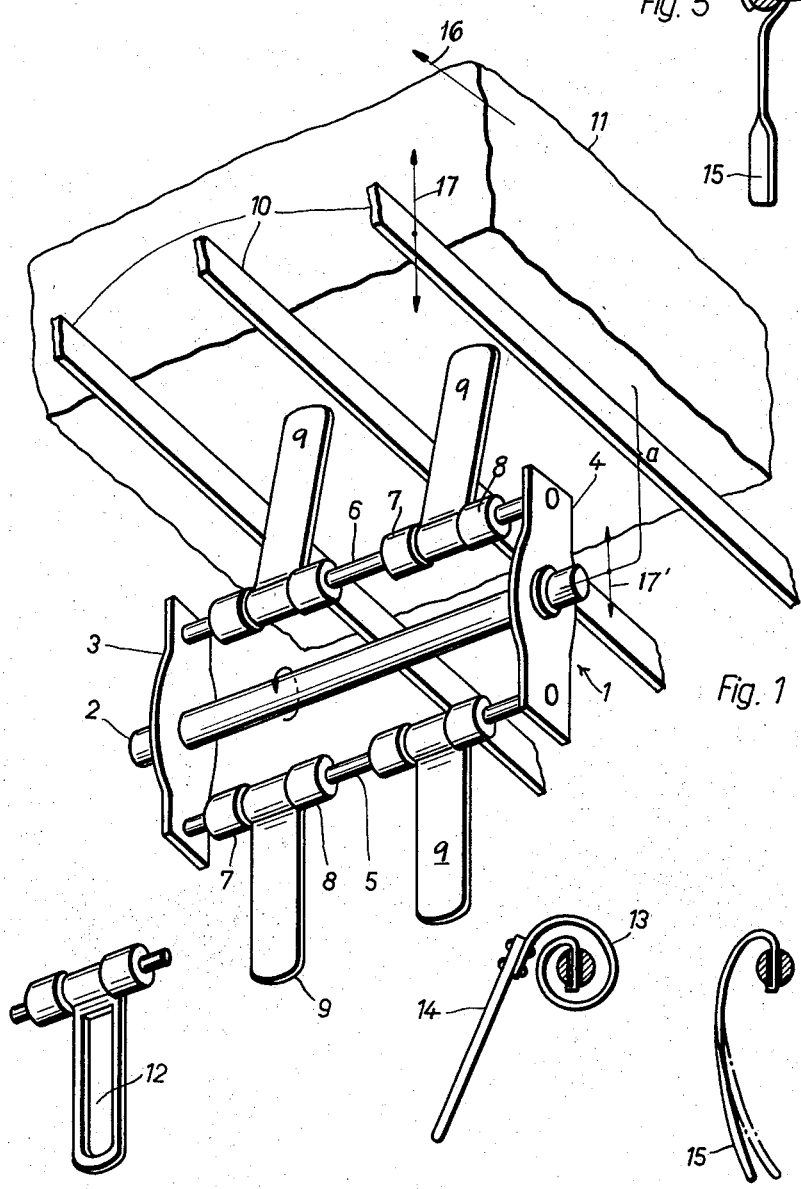

INVENTORS.
RUDOLF HUBER.
RUDOLF WILDBOLZ.
BY CHRISTIAN JUST.
K. A. Mayr
ATTORNEY.

United States Patent Office 2,942,304
Patented June 28, 1960

2,942,304
BEATING DEVICE FOR OPENING FIBRE BALES

Rudolf Huber, Rudolf Wildbolz, and Christian Just, Winterthur, Switzerland, assignors to Joh. Jacob Rieter & Co. Ltd., Winterthur, Switzerland, a corporation of Switzerland Filed Mar. 4, 1957, Ser. No. 643,621

Claims priority, application Switzerland Mar. 6, 1956

9 Claims. (Cl. 19—80)

The present invention relates to a beating device for opening fibre bales, particularly cotton bales.

The device according to the invention comprises a beater element swingable on a shaft which is spaced from and rotates around an axis which is parallel to the shaft. The axial extension of the beater element is small relatively to its radial extension. The bales to be opened travel in spaced relation to and in a direction which is transverse to the longitudinal axis of the shaft supporting the beater element and the mass and/or the elastic properties of the element are so that the element after beating against a bale swings and/or is bent to pass along the bale at a reduced depth.

Tests have shown that with the device according to the invention the separated fibre tufts are not only more thoroughly opened and cleaned but also contain less torn and short fibres than is the case with conventional bale openers.

Conventional bale openers are provided with a plurality of rigid prongs which may be groupwise rigidly interconnected and which damage the fibres when engaging the bales because the individual prongs do not yield.

The novel features which are considered characteristic of the invention are set forth with particularity in the appended claims. The invention itself, however, and additional objects and advantages thereof will best be understood from the following description of embodiments thereof when read in connection with the accompanying drawing in which:

Fig. 1 is a perspective view of a device according to the invention;

Fig. 2 shows a modification of a detail of the device shown in Fig. 1;

Fig. 3 is a side view of a modified beater element;

Fig. 4 is a side view of another modification of a beater element;

Fig. 5 is a side view of a further modification of a beater element;

Figure 6:
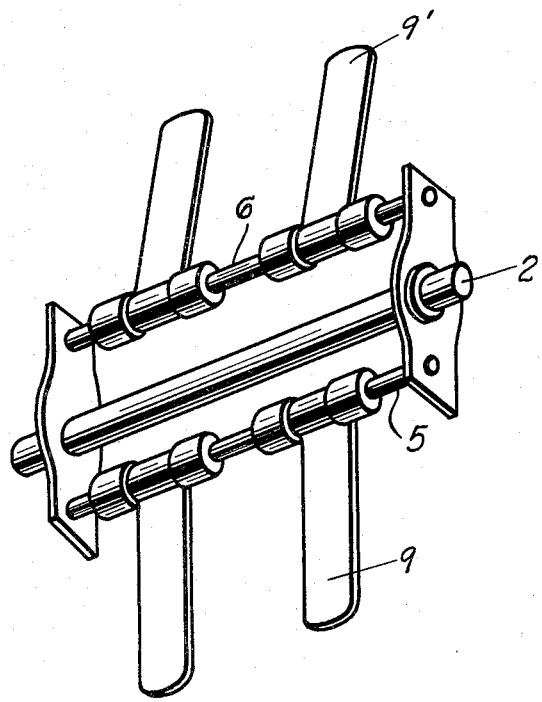
Fig. 6 is a perspective illustration of a modified beating apparatus according to the invention.

Referring more particularly to Fig. 1 of the drawing a beater 1 includes a drive shaft 2 which is supported in bearings in a machine frame, not shown. Flanges 3 and 4 are rigidly connected with the shaft 2 and support rods 5 and 6 which are spaced from and parallel to the shaft 2. A plurality of beater elements 9 are individually swingable on each rod 5 and 6. Each element 9 is placed between two collars 7 and 8 which secure the elements against axial movement on the rods. The distance between the shaft 2 and the rods 5 and 6 need not be the same, if the difference is compensated by installing beater elements of different lengths. This modification is illustrated in Fig. 6 in which the distance of the support rod 6 from the drive shaft 2 is greater than that of the rod 5 from the shaft 2. The beater elements 9 swinging on the rod 5 are longer than the beating elements 9' swinging on the rod 6.

A grate 10 is placed above the beater 1 on which grate rests a fibre bale 11 which is moved on the grate in the direction of the arrow 16 by means, not shown. The distance $\alpha$ between the drive shaft 2 and the grate 10 is maintained by conventional means, not shown, and is so great that the beater elements 9 hit the bale 11 when the elements are in almost radial position. This loosens the affected fibres. The elements 9 are diverted from the radial position when hitting the bale, the extent of the diversion depending on the nature of the material of which the bale is composed. The beater element is then dragged along the bale, engaging the bale less deeply than the depth defined by a circle around the respective rod which circle has a radius corresponding to the length of the beater element. The loosened fibres are scraped off by the subsequent beater element. This operation avoids tearing of the fibres.

The distance between the rotation axis 2 and the carrier means 10 may be changed by moving the latter in the direction of arrows 17 by conventional means, not shown. The same effect can be obtained by making the position of the drive shaft 2 adjustable (arrow 17').

Fig. 2 shows a modified design of a beater element. Its peripheral configuration is substantially the same as that of the elements 9, shown in Fig. 1. An aperture 12 is provided in the beater element to reduce production of undesired air currents.

In the modification shown in Fig. 3 the beater element 14 is connected with the respective rod or shaft by means of a spiral spring 13. By proper selection of the mass of the beater element and of the spring and of the strength of the latter, the beating and scraping effect can be adjusted to suit individual requirements.

Fig. 4 shows a beater element 15 made of resilient material which produces a similar effect with a relatively small mass as the rigid elements shown in Figs. 1 and 2 which have a relatively great mass.

The beater element shown in Fig. 3 combines the features of the elements shown in Figs. 1, 2, and 4.

The elements shown in Figs. 3 and 4 may be mounted on the drive shaft 2 so that the members 3, 4, 5, and 6 can be omitted, resulting in a considerably simplified device.

In the beater element shown in Fig. 5 the end portion 15 is twisted for producing an air current which is parallel to the rod 6 and removes the loosened fibre tufts in that direction.

As shown in the drawing the beater elements are of elongated configuration whose width should not exceed approximately one fifth of its length.

We claim:

1. A beating device for opening fibre bales comprising means for movably carrying the fibre bales, a rotatable drive shaft placed in spaced relation and parallel to said means and transversely to the direction of movement of the bales, and beating elements supported by and being swingable relatively to said drive shaft, the radial extension of said elements being greater than the distance between said drive shaft and the bales and the width of said elements being not more than one fifth of the length of the elements.

2. A beating device as defined in claim 1 in which said beating elements are rigid.

3. A beating device as defined in claim 1 in which said beating elements are resilient.

4. A beating device as defined in claim 1, including support means parallel to, spaced from, and rigidly connected with said drive shaft and swingably supporting said elements.

5. A beating device as defined in claim 1, including means for resiliently connecting said elements with said drive shaft.

6. A beating device as defined in claim 1, including support means parallel to, spaced from, and rigidly connected with said drive shaft, and means for resiliently connecting said elements with said support means.

7. A beating device as defined in claim 1 in which the spacing between said drive shaft and said means for carrying the fibre bales is adjustable.

8. A beating device as defined in claim 1, including support means parallel to, spaced from, and rigidly connected with said drive shaft; said elements having the form of rigid leaves which are individually hinged to said support means.

9. A beating device according to claim 8 in which the outer ends of said elements are bent to form an angle with respect to the swing axes of said elements.

References Cited in the file of this patent

UNITED STATES PATENTS

| | | |
|---|---|---|
| 165,066 | Crane | June 29, 1875 |
| 321,851 | Potter | July 7, 1885 |
| 573,931 | Swenson | Dec. 29, 1896 |
| 2,809,400 | Maltenfort | Oct. 15, 1957 |